United States Patent
Donhoffner et al.

(10) Patent No.: US 11,302,202 B2
(45) Date of Patent: *Apr. 12, 2022

(54) AIRCRAFT STATUS DETERMINATION BASED ON AIRCRAFT TRANSPONDER SIGNALS

(71) Applicant: Federal Express Corporation, Memphis, TN (US)

(72) Inventors: Robert Anthony Donhoffner, Oakland, TN (US); Bennett Michael Wetherald, Hernando, MS (US); Danny Jay Reed, Walls, MS (US)

(73) Assignee: Federal Express Corporation, Memphis, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/819,877

(22) Filed: Mar. 16, 2020

(65) Prior Publication Data

US 2020/0219405 A1    Jul. 9, 2020

Related U.S. Application Data

(63) Continuation of application No. 15/988,885, filed on May 24, 2018, now Pat. No. 10,636,312.

(51) Int. Cl.
  *G08G 5/00* (2006.01)
  *B64D 43/00* (2006.01)
(52) U.S. Cl.
  CPC ........... *G08G 5/0047* (2013.01); *B64D 43/00* (2013.01)
(58) Field of Classification Search
  CPC .. A01B 79/005; A01D 41/1274; B64D 43/00; G01C 23/00; G01S 5/0294; G01S 7/24;
  (Continued)

(56) References Cited

U.S. PATENT DOCUMENTS 7,587,278 B2    9/2009  Poe
7,612,688 B1 *  11/2009 Vigeant-Langlois .......................
                                                    G01S 13/953
                                                          340/971
(Continued)

FOREIGN PATENT DOCUMENTS

EP          2299422      3/2011
EP          2899508      7/2015
(Continued)

OTHER PUBLICATIONS

"The Electronic Flight Bag: A Multi-Function Tool for the Modern Cockpit", Fitzsimmons, Mjr. Fredric, IITA Research Publication 2—Information Series; Institute for Information Technology Applications, United States Air Force Academy, Colorado, USA; Aug. 2002 (Year: 2002).*

(Continued)

*Primary Examiner* — Stephen R Burgdorf
(74) *Attorney, Agent, or Firm* — Fish & Richardson P.C.

(57) ABSTRACT

Methods, systems, and apparatus, including computer programs encoded on a computer storage medium, for receiving aircraft transponder signals. Identifying, from among the aircraft transponder signals, a first aircraft transponders signal based on an identifier, wherein the identifier indicates that the first aircraft transponder signal is associated with an aircraft on which the computing system is located. Identifying first location data within the first aircraft transponder signal. Generating second location data by converting the first location data to a format recognizable by a geographic mapping application, where the second location data is readable by the geographic mapping application to permit the geographic mapping application to present a graphical representation of a geographical location of the aircraft as represented by the first location data. Providing the second (Continued)

location data to the geographic mapping application for presentation to a user.

20 Claims, 3 Drawing Sheets

(58) Field of Classification Search
CPC .... G01S 19/14; G06Q 10/00; G06Q 30/0609; G06Q 50/02; G08G 1/0141; G08G 5/0004; G08G 5/0013; G08G 5/0021; G08G 5/045; G08G 5/0047; G08G 5/0069; G08G 5/0091; H04W 4/021
USPC .......................................................... 340/971
See application file for complete search history.

(56) References Cited

U.S. PATENT DOCUMENTS

| | | | |
|---|---|---|---|
| 7,769,501 | B2 | 8/2010 | Lusardi et al. |
| 8,751,067 | B2 | 6/2014 | Pham |
| 8,836,571 | B2* | 9/2014 | Colle ................... G01S 5/0072 342/45 |
| 9,495,879 | B2 | 11/2016 | Depape |
| 9,824,591 | B1 | 11/2017 | Ryan |
| 10,302,759 | B1 | 5/2019 | Arteaga |
| 11,022,696 | B1* | 6/2021 | Kacem ................ G06F 11/1004 |
| 2002/0021247 | A1* | 2/2002 | Smith .................... G01S 13/781 342/450 |
| 2002/0075171 | A1 | 6/2002 | Kuntman |
| 2008/0004798 | A1 | 1/2008 | Troxler |
| 2008/0036659 | A1 | 2/2008 | Smith |
| 2008/0208399 | A1 | 8/2008 | Pham |
| 2008/0215198 | A1 | 9/2008 | Richards |
| 2010/0109936 | A1* | 5/2010 | Levy ...................... G08G 5/065 342/30 |
| 2010/0152924 | A1 | 6/2010 | Pandit et al. |
| 2011/0066362 | A1 | 3/2011 | He |
| 2012/0000212 | A1 | 1/2012 | Sanders |
| 2012/0038501 | A1 | 2/2012 | Schulte |
| 2012/0271616 | A1* | 10/2012 | Ludwig .................. G08G 1/081 703/28 |
| 2013/0033381 | A1 | 2/2013 | Breed |
| 2014/0197980 | A1 | 7/2014 | Schulte |
| 2014/0197981 | A1 | 7/2014 | Hartley |
| 2014/0266668 | A1 | 9/2014 | Blankenship |
| 2015/0042504 | A1 | 2/2015 | Mofitt |
| 2015/0212782 | A1 | 7/2015 | Samuthirapandian |
| 2016/0189549 | A1 | 6/2016 | Marcus |
| 2017/0140656 | A1 | 5/2017 | Mott |
| 2017/0236426 | A1 | 8/2017 | Kleywegt |
| 2018/0268740 | A1 | 9/2018 | Yao |
| 2019/0162841 | A1 | 5/2019 | Peckham |
| 2019/0280871 | A1* | 9/2019 | Subramanian ....... G06Q 20/325 |
| 2019/0355264 | A1* | 11/2019 | Dolan .................. G08G 5/0013 |
| 2019/0362638 | A1 | 11/2019 | Donhoffner |
| 2019/0383936 | A1* | 12/2019 | Bartone ................. G01S 7/003 |

FOREIGN PATENT DOCUMENTS

| | | |
|---|---|---|
| EP | 3200171 | 8/2017 |
| EP | 3214612 | 9/2017 |
| JP | 2004189143 | 7/2004 |
| JP | 2005249467 | 9/2005 |

OTHER PUBLICATIONS

Dunstone, Greg; "ADS-B Introduction", Dec. 6, 2012, Airservices Australia, downloaded from: https://www.icao.int/APAC/Meetings/ 2012 SEA BOB ADSB WG8/SPO1 AUS%20-%20ADS-B%20Basics. pdf, 35 pages (Year: 2012).

Invitation to Pay Additional Fees in International Application No. PCT/US2019/033981, dated Sep. 16, 2019, 15 pages.

* cited by examiner

AIRCRAFT STATUS DETERMINATION BASED ON AIRCRAFT TRANSPONDER SIGNALS

CROSS-REFERENCE TO RELATED APPLICATION

This application is a continuation of U.S. patent application Ser. No. 15/988,885, filed May 24, 2018, the disclosure of which is expressly incorporated herein by reference in its entirety.

BACKGROUND

Onboard flight status systems can be used on aircraft to keep the flight crew and/or passengers informed about the aircraft's status during a flight. Some flight status systems are integrated into the avionics systems of the aircraft. However, such systems must conform to FAA regulations and, thus, can be overly complex and expensive. Other onboard flight status systems are standalone systems. Such systems may avoid the complexity and expenses associated with integrated systems but can be inaccurate and unreliable because they are not integrated with the aircraft but depend on satellite-transmitted signals external to the aircraft, such as GPS signals, to obtain aircraft status.

SUMMARY

Implementations of the present disclosure include methods, systems, and apparatuses for determining aircraft status based on aircraft transponder signals. More particularly, implementations of the present disclosure are directed to determining geographical location of an aircraft based on the transponder signals transmitted by the aircraft.

In general, innovative aspects of the subject matter described in this specification can be embodied in methods that include the actions of receiving aircraft transponder signals. Identifying, from among the aircraft transponder signals, a first aircraft transponders signal based on an identifier, wherein the identifier indicates that the first aircraft transponder signal is associated with an aircraft on which the computing system is located. Identifying first location data within the first aircraft transponder signal. Generating second location data by converting the first location data to a format recognizable by a geographic mapping application, where the second location data is readable by the geographic mapping application to permit the geographic mapping application to present a graphical representation of a geographical location of the aircraft as represented by the first location data. Providing the second location data to the geographic mapping application for presentation to a user. Other implementations of this aspect include corresponding systems, apparatus, and computer programs, configured to perform the actions of the methods, encoded on computer storage devices. These and other implementations may each optionally include one or more of the following features.

Some implementations include the action of extracting the first aircraft transponder signal from the aircraft transponder signals.

In some implementations, extracting the first aircraft transponder signal includes filtering out information of one or more aircrafts from the aircraft transponder signals, where each of the one or more aircrafts are different from the aircraft on which the computing system is located.

In some implementations, the identifier is included in a header of the first aircraft transponder signal.

In some implementations, the geographic mapping application displays a geographical presentation of the second location data.

In some implementations, providing the second location data to the geographic mapping application includes broadcasting the second location data to one or more computing systems through a local communication network within the aircraft.

In some implementations, the first aircraft transponder signal has been transmitted by the first aircraft.

In some implementations, the aircraft transponder signal includes an ADS-B Out signal.

In some implementations, the identifier is provided by a user.

In some implementations, converting the first location data includes determining that the aircraft is on the ground, and in response, determining the geographical location of the aircraft from among multiple possible geographical regions identified by the first location data.

In some implementations, the geographical location is determined based on comparing the multiple geographical regions identified by the first location data, and a list of airports.

In some implementations, the geographical location is location of an airport with a shortest distance from at least one region among the multiple possible geographical regions identified by the first location data.

In some implementations, the geographical location is location of an airport within a predetermined distance of at least one region among the multiple possible geographical regions identified by the first location data.

In some implementations, geographical coordinates of the multiple possible geographical regions differ from each other by a factor of a particular angle along at least one of a longitude direction and a latitude direction.

Particular implementations of the subject matter described in this specification can be implemented so as to realize one or more of the following advantages. Implementations provide improved accuracy and reliability of existing onboard aircraft status systems that do not integrate into aircraft avionics. For example, implementations do not rely on satellite signals (e.g., global positioning system (GPS) signals) to determine aircraft flight status which can be severely attenuated by the aircraft's fuselage. Determining the aircraft's status (e.g., geographical location) based on weak or even unavailable signals can be prone to errors. Implementations of the present disclosure may improve accuracy, availability, and integrity of determining aircraft status by providing alternative techniques for aircraft status determination. For example, implementations determine the status of the aircraft based on transponder signals transmitted by the aircraft. In so doing, implementations can use data obtained by the aircraft's high accuracy avionics equipment and certified onboard GPS without interfacing physically with the avionics systems. Consequently, implementations may reduce the complexity and improve accuracy of onboard aircraft status systems. Furthermore, implementations may improve aircraft safety by reducing risks that a malfunctioning onboard status system may interfere with the operation of the aircraft's avionics systems.

The details of one or more implementations of the present disclosure are set forth in the accompanying drawings and the description below. Other features and advantages of the present disclosure will be apparent from the description and drawings, and from the claims.

DETAILED DESCRIPTION

Implementations of the present disclosure are generally directed to onboard status monitoring and display systems for aircraft. Specifically, implementations are directed to an onboard aircraft status system that can generate aircraft status data based on an aircraft's own transponder signals. Because aircraft transponder signals include highly accurate aircraft status data from an aircraft's avionics systems and sensors, implementations can provide reliable and accurate own-ship status displays without being physically integrated into the aircraft's avionics systems. For example, an onboard aircraft status system can receive aircraft transponder signals, which may include signals from multiple aircrafts. The system can process the transponder signals to identify the signals that were transmitted by the aircraft on which the system is located. For example, aircraft transponder signals can include regulated aircraft transponder signals such as automatic dependent surveillance-broadcast (ADS-B) signals. The system can extract own-ship status data from the transponder signals for use in generating graphical displays that represent the aircraft's status. Examples of the aircraft status data (can also be referred to as "status" or "own-ship status") can include, but are not limited to, geographic position (e.g., longitude, latitude), altitude, speed, heading, and rate of climb/descent.

Implementations of the present disclosure are described in further detail with reference to an example context. The example context is an aviation context. It is contemplated, however, that implementations of the present disclosure can be realized in other appropriate contexts. For example, crew status systems may be applicable in other transportation and shipping industries. For example, the systems and processes described herein may be implemented on ships by using the ships Automatic Identification System (AIS) transponder signals.

Figure 1:
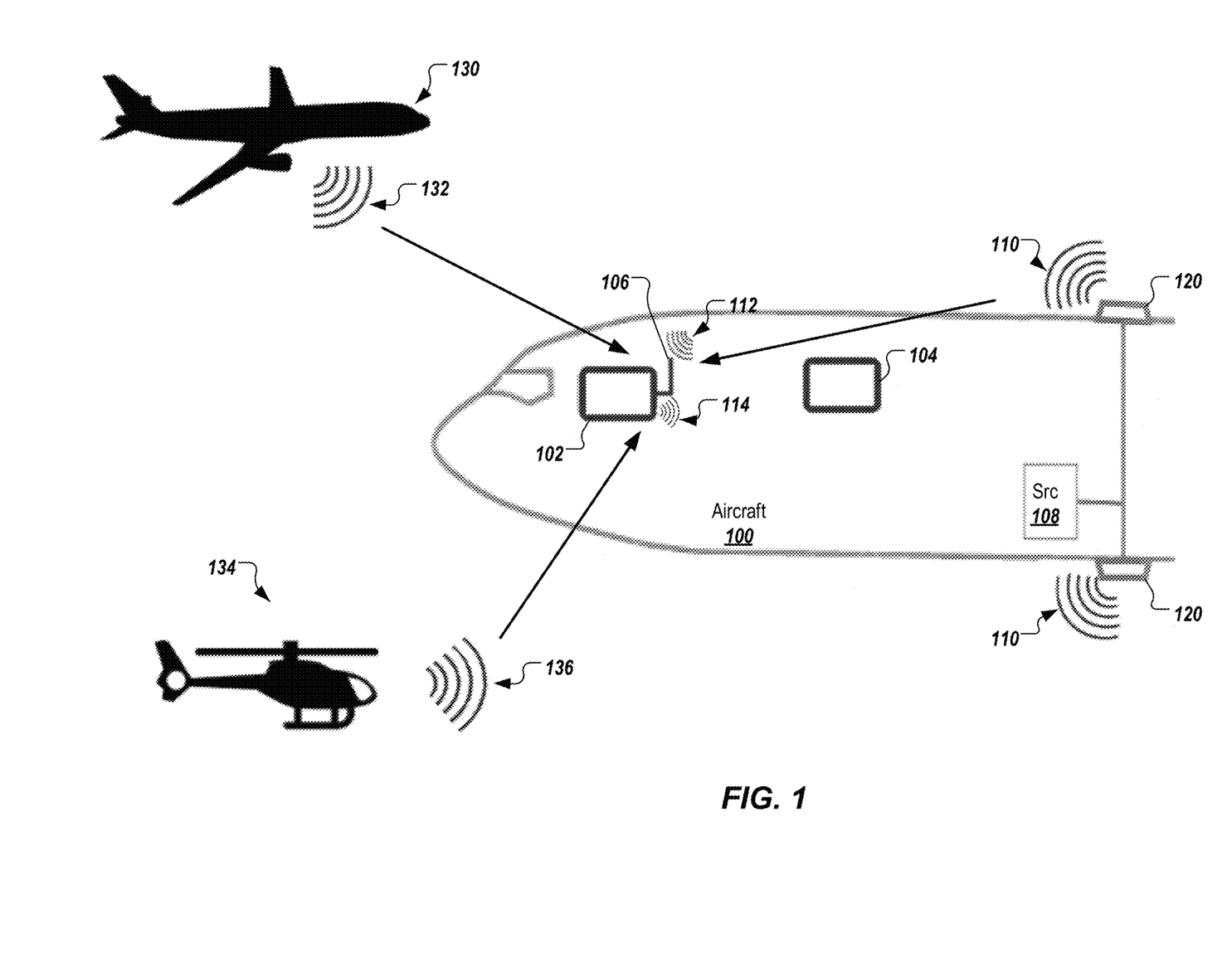
FIG. 1 depicts an example onboard aircraft status system according to the implementations of the present disclosure.

FIG. 1 depicts an example onboard aircraft status system 102 according to the implementations of the present disclosure. The status system 102 is located on an aircraft 100 and configured to provide status information about the aircraft 100 to personnel on the aircraft (e.g., flight crew and/or passengers). In one example, the aircraft status system can be implemented on an electronic flight bag (EFB). For example, the status system 102 can be used to present status information about aircraft 100 to flight crew or passengers through display systems internal to the aircraft 100. In some implementations, aircraft status system 102 is configured to broadcast status information about aircraft 100 to one or more display systems 104. For example, aircraft status system 102 can broadcast data to a display system 104 through an internal computer network (e.g., a WiFi network) on aircraft 100. The display system 104 can be a user computing device (e.g., smartphone, laptop, tablet, etc.), a flight crew computing device (e.g., an electronic flight bag), or an in-flight display system including a display screen to display geographic location of the aircraft to the crew or to passengers, etc.

Figure 2:
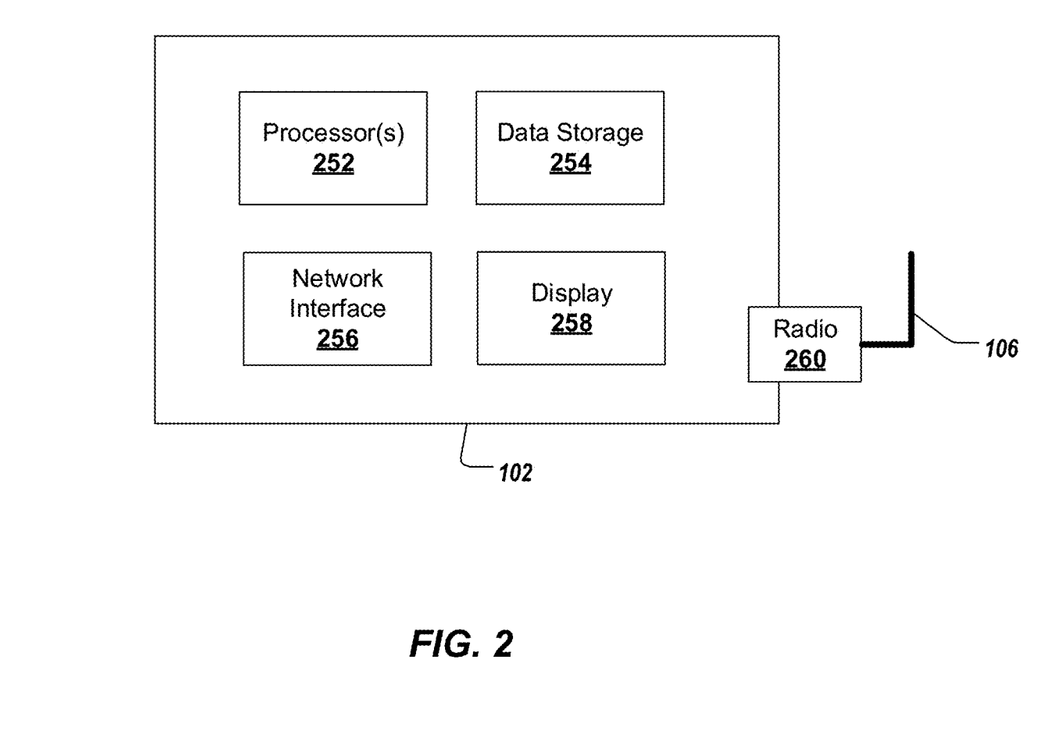
FIG. 2 depicts a block diagram of an example onboard aircraft status system in accordance with the implementations of the present disclosure.

FIG. 2 depicts a block diagram of the onboard aircraft status system 102. The aircraft status system 102 can be a portable computing device (e.g., an EFB, or tablet computer). Status system 102 includes one or more processor(s) 252, a data storage 254, a network interface 256, a display 258, and a radio 260. The radio 260 can be an external device that can be connected to the status system 102 (e.g., a dedicated radio receiver, demodulator, SDR, or combinations thereof), or the radio can be integrated into the status system 102. The radio is configured to receive aircraft transponder signals. For example, the radio 260 can be implemented as a software-defined radio (SDR) tuned to the channel of the aircraft's 100 transponder and configured to demodulate the transponder signals. The data store 254 can include program instructions (e.g., one or more software applications) for processing the aircraft's 100 transponder signals according to the methods described below. The network interface 256 can be, for example, a WiFi interface to broadcast aircraft status information to other computing devices (e.g., display systems 104) within the aircraft 100.

In some implementations, the aircraft status system 102 can be provided as a kit. For example, the aircraft status system 102 can be provided as an upgrade kit to improve the performance of existing flight tracking systems such as existing EFBs. An example aircraft status upgrade kit can include, but is not limited to, radio 260, antenna 106 (e.g., an ADS-B out antenna tuned to ADS-B out frequency of, for example, 1090 MHz), and an aircraft status system software application. For example, in an aircraft status system upgrade kit radio 260 can be implemented as an SDR on a USB dongle to provide an existing EFB with the ability to receive aircraft transponder signals. Furthermore, an aircraft status system software application can be provided for installation on the EFB. The aircraft status system software application can process the transponder signals according to the processes described below to generate data that is compatible with flight tracking software on the EFB.

Referring to FIG. 1, in operation the aircraft status system 102 receives transponder signal 110. Transponder signal 110 is transmitted from one or more transponder antennas 120 on aircraft 100. For example, the transponder antenna 120 can be located on the fuselage of the aircraft. In some implementations, the transponder antenna 120 is an ADS-B transmitter. The status system 102 receives the transponder signals 110 by the antenna 106. The antenna 106 can be integrated into the computing device 250 (FIG. 2), or can be a separate element pluggable to the computing device. For example, the antenna 106 can be integrated into the radio 260, or can be a separate element connectable to the radio 260. The antenna 106 can be an omnidirectional antenna, such as a monopole antenna, a dipole antenna, etc. In some examples, the antenna 106 is compact, e.g., with a few inches length.

The transponder signal 110 includes data indicating the status of the aircraft 100. For example, the transponder signal 110 can be an automatic dependent surveillance—broadcast (ADS-B) signal transmitted. ADS-B Out signals transmitted by the transponder antennas 120 can be received by the radio 260 (FIG. 2) of the aircraft status system 100. The transponder signal 110 encodes aircraft status data obtained from the aircraft's onboard avionics systems. For example, a transponder 108 can be coupled to the aircrafts avionics to collect the aircraft status data from the avionics systems and encode the data in the transponder signal. For example, the transponder signal can encode aircraft status data including, but not limited to, location data (e.g., latitude/longitude), speed, heading, altitude, rate of climb/ descent, aircraft identifier (e.g. call sign, tail number, squawk code, etc.), or a combination thereof. The transponder data may be more accurate than, for example, GPS received on a standalone flight status system. The transponder signal, by contrast, has a much higher power than a GPS satellite signal inside the aircraft's fuselage and relies on the aircraft's own highly sensitive avionics as the source of the data contained therein. Therefore, by making use of the aircraft's own transponder signals, the aircraft status system 102 can function with the precision and accuracy of aircraft's avionics but without the complexity and potential safety risks noted above.

The aircraft status system 102 demodulates the received transponder signals. For example, the radio 260 can demodulate the received transponder signals. The radio 260 can be configured to receive ADS-B signals. For example, the radio 260 can be tuned to the frequency of the transponder signals and programmed to perform an appropriate demodulation (e.g., FM, AM, PM, etc.) on the received transponder signals.

The aircraft status system 102 determines the status of the aircraft 100 based on the received transponder signal 110. In some examples, the aircraft status system 102 may need to identify transponder signal 110 (of aircraft 100) from among multiple received transponder signals 112. For example, the aircraft status system 102 may receive multiple transponder signals from different aircrafts. For example, the received transponder signals 112 may include transponder signals 110, 132, and 136 transmitted from the aircrafts 100, 130, and 134, respectively. In some implementations, the aircraft status system 102 can extract or filter out data received from one or more transponder signals from other aircraft (e.g., aircraft 130 and 134). For example, the aircraft status system 102 can format the status information of the other aircraft for display along with the status information for aircraft 100.

To identify the transponder signal 110, the aircraft status system 102 can locate an aircraft identifier of signal 110 within the transponder received transponder signals 112. For example, the identifier can be associated with the aircraft 100 to identify its transponder signal 110. For example, the aircraft status system 102 can identify the transponder signal 110 based on a header included in the data of the received transponder signals 112. Each header includes an aircraft identifier (e.g., tail number, call sign, etc.) to identify the aircraft that has transmitted the respective signal. For example, the data of the received transponder signals 112 can include data of the transponder signals 110, 132, and 136. Each of these transponder signals can include an identifier specific to the aircraft that transmitted the respective transponder signal. Based on the identifiers, aircraft status system 102 can determine the transponder signal that is specific to the aircraft 100 (e.g., transponder signal 110) and the associated aircraft status data. The transponder signals that are not specific to the aircraft 100 can be filtered out (e.g., transponder signals 132, 136).

In some implementations, the aircraft status system 102 uses an identifier filter to identify data associated with the aircraft 100 from among the received transponder signals. The aircraft status system 102 may store a copy of an identifier associated with the aircraft 100, e.g., in data storage 254 and compare the stored identifier with one or more headers that are included in the received transponder signals, to identify data corresponding to the aircraft 100. For example, in a portable implementation of the aircraft status system 102 (e.g., as an EFB), a user (e.g., a flight crewmember) may input the identifier of aircraft 100 during pre-flight procedures. During operation, the aircraft status system 102 can identify the transponder signal 110 of aircraft 100 by comparing headers of received transponder signals 112 to the stored aircraft identifier.

The aircraft status system 102 can determine the flight status of aircraft 100 (e.g., "own-ship status") by parsing the data contained in the identified transponder signal 110. For example, the transponder signal 110 can include information on aircraft status such as, but not limited to, location (e.g., latitude, longitude), speed, altitude, heading, accuracy of GPS signal, aircraft identification (e.g., tail number, call sign, etc.), squawk code, rate of climb, rate of decent, emergency codes, etc. The aircraft status system 102 can parse the data of the transponder signal 110 to extract desired status data. In some examples, the aircraft status system 102 parses the data to obtain aircraft status data that is relevant to displaying the aircraft's 100 location on a graphical map of the flight plan. For example, the aircraft status system 102 can parse the data to obtain geographical location data (e.g., latitude, longitude) of the aircraft 100. In some examples, location data can include aircraft speed and heading, for example, to indicate the aircraft's speed and heading on the graphical map. In some examples, the portions of the data that are unrelated to the particular status (e.g., unrelated to the geographical location) are filtered out.

The aircraft status system 102 generates aircraft status data that is compatible with a status display application. For example, the transponder signal data may be in a unique format that is incompatible with a graphical mapping application (e.g., a GPS based mapping application). The aircraft status system 102 can convert the status data of the geographical location into a format that is recognizable by a graphical mapping application. For example, the aircraft status system 102 can convert location data from the transponder signal 110 into a GPS data format that is accepted by a display application.

The aircraft status system 102 can then provide the converted data to the display application for presentation on a local display (e.g., display 258), broadcast the data over a local wireless network to display systems 104, or both. For example, a mapping application can be installed on the aircraft status system 102. For example, the processor(s) 252 can provide the converted status data the mapping application for presentation on display screen 258 of aircraft status system 102. In some implementations, the mapping application is installed on a display device 104, different from the status system 102. For example, the network interface 256 can broadcast the particular status of the second format for presentation on the display device 104. The data can be broadcasted (114) through a local communication network within the aircraft 100 (e.g., a WiFi). Examples of devices that can present the aircraft status include, but are not limited to, Electronic Flight Bags (EFB), tablets, smart phones, and laptops. Such devices can be located in any part of the aircraft, including cockpit, passenger seats, fuselage walls, etc. Examples of the applications used for presenting the status of the aircraft include Airport Moving Map (AMM), geographic mapping application, etc. The application can present the status to a user, or to another computing device for further processing.

In some implementations, the aircraft status system 102 can convert the transponder status data into a data format recognizable by "smart cargo" devices. Smart cargo can include shipping containers that include control systems to regulate environmental factors of the cargo stored inside. For example, smart cargo systems can monitor environmental factors inside a shipping container such as air pressure, humidity, temperature, light, location, etc. In some examples, the aircraft status system 102 can broadcast aircraft status information such as altitude to smart cargo devices in order for the smart cargo devices to regulate micro environmental conditions within the cargo package. In some examples, the smart cargo devices can control micro environmental conditions inside the cargo package in response to aircraft status data from the aircraft status system 102. In some implementations, an aircraft status system 102 can coupled to a smart cargo device to control environmental conditions of the one or more cargo packets based on the received transponder signals. For example, a smart cargo device can estimate a time of arrival of the associated cargo package at an airport based on the location of the aircraft 100 location indicated by the transponder signals. The smart cargo device may be capable of transmitting a message to a recipient of the package indicating the estimated arrival time.

In some implementations, the transponder signal characteristics may vary depending on whether the aircraft is in flight or on the ground. For example, aircraft location data may be less detailed when the aircraft is on the ground than when the aircraft is in flight. For example, on the ground, the transponder signal may transmit location data in a shortened format (e.g., using fewer digits). Without correlation from other sources, the location data transmitted while the aircraft is on the ground may map to multiple ambiguous locations within the geographic mapping application. In other words, the geographic mapping application may require complete longitude and latitude coordinates, whereas the transponder data may truncate coordinates (e.g., leaving off an indication of north or south latitude) because all airport traffic control systems receiving the ground transponder signal would be pre-programmed to recognize which hemisphere the aircraft is located in while on the runway.

Accordingly, transponder signals can be processed differently based on the operation of the aircraft 100. For example, when the aircraft is on the ground, the aircraft status system 102 can identify the aircraft's geographical location from among the ambiguous geographical regions. The list of geographical regions can include one or more regions associated with a GPS data in the transponder signal 110. In some examples, the longitude or the latitude (or both) of the regions in the list differ from respective longitude or latitude (or both) indicated in the GPS data by a factor of a particular angle. For example, latitude of each region may differ from the GPS data's latitude by a factor of ninety degrees (for example, a first region in the list may have the same longitude as the GPS data's longitude, and a latitude of the GPS data plus ninety degrees).

In some examples, the geographical location of the aircraft 100 is determined based on comparing the one or more regions in the list of possible geographical regions, to location of one or more airports (or airfields). For example, the location of the one or more airports can be retrieved from the data storage 254. In some examples, the geographical location of the aircraft 100 is determined to be an airport that is within a particular distance from at least one of the regions in the list. For example, when the aircraft is on the ground but the GPS data does not match geographical location of an airport, the regions in the list can be checked to find an airport within a particular distance (e.g., one mile) of at least one region in the list. In some examples, the first region that is within the particular distance of an airport is marked, and the airport is determined as the geographical location of the aircraft 100. In some examples, the airport that has the closest distance from at least one of the regions in the list is determined as the geographical location of the aircraft 100.

As explained above, in some implementations, the status system 102 performs demodulation and/or data processing. In some implementations, the status system 102 forwards the transponder signals to a processing device capable of performing demodulation and/or data processing. In some examples, the status system 102 acts as a repeater, receiving and re-transmitting data extracted from the transponder signals 112 to the processing device. For example, the processing device can be paired with, or connected to (wired or wirelessly) the status system 102.

Figure 3:
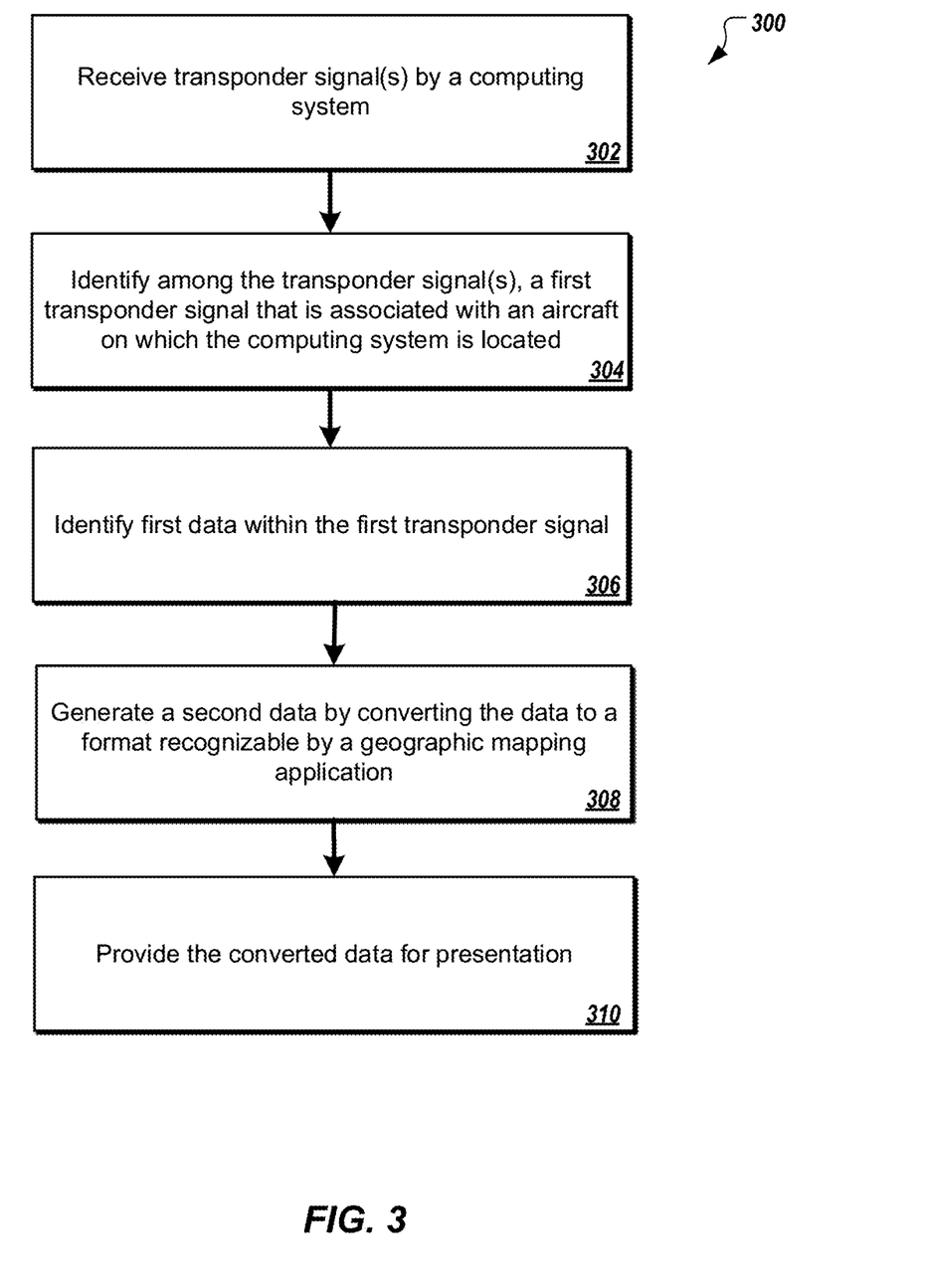
FIG. 3 depicts a flowchart of an example process according to the implementations of the present disclosure.

FIG. 3 depicts a flowchart of an example process 300 according to the implementations of the present disclosure. For example, the process 300 can be performed by the onboard aircraft status system 102 located on the aircraft 100.

Transponder signal(s) are received by a computing system (302). For example, the status system 102 receives the transponder signals 110, 132, and 136 through the antenna 106 and/or the radio 260. The transponder signal(s) can include ADS-B Out signals transmitted by one or more aircrafts.

A first transponder signal is identified among the transponder signal(s) (304). For example, the first transponder signal can be associated with an aircraft on which the computing system is located. For example, the transponder signal 110 associated with the aircraft 100 can be identified among a set of received transponder signals 112. In some examples, the first transponder signal is transmitted by the aircraft on which the computing system is located. For example, the transponder signal 110 is transmitted by transponder antenna 120 of the aircraft 100. In some implementations, the first transponder signal is identified from among the transponder signal(s) based on an identifier. The identifier indicates that the first transponder signal is associated with the aircraft on which the computing system is located. Examples of the identifier include, but are not limited to, tail number, call sign, or ICAO address/Mode-S code of the aircraft. The identifier can be inputted to the aircraft status system 102 by a user, and be stored in the data storage 254.

In some implementations, the first transponder signal is extracted from among the transponder signal(s). For example, the first transponder signal can be the transponder signal 110. For example, the received transponder signals 112 are demodulated, data of the transponder signal 110 transmitted by the aircraft 100 (on which the status system 102 is located) is retained, and data of transponder signals of other aircrafts (e.g., transponder signals 132 and 136) can be filtered out.

First data is identified within the first transponder signal (306). In some examples, the first transponder signal is decoded and first data is extracted. In some examples, data of the first transponder signal is parsed to obtain the first data. The first data can include the aircraft's geographical location (e.g., the aircraft's latitude, longitude, or a combination thereof).

A second data is generated by converting the first data to a format recognizable by a geographic mapping application (308). For example, the extracted first data can be converted to a format recognizable by a geographic mapping application. In some examples, the first data has a first format that is converted to a second format recognizable by the application. For example, the data on an ADS-B Out signal can be converted to a format recognizable by a mapping application. For example, the second format can be a global positioning system (GPS) data format, such as NMEA, GGA sentences, etc. Converting the data format may be performed through one or more data transformations. For example, the data of the ADS-B signals may be transformed into an intermediate format (e.g., a format based on metric units), and from the intermediate format to a format recognizable by the application.

The converted data is provided for display to a user (310). For example, the second data location can be presented by the geographic mapping application. In some examples, the second data is presented (e.g., displayed) to a user by the computing device (e.g., status system 102). In some examples, the data is provided to a second computing device for presentation. For example, the second data can be broadcasted to the second computing device, for example, through a local communication network. An EFB device, a tablet, a laptop, or any other computing device located in the aircraft can present the geographical location of the aircraft. The second data can be displayed through a graphical location presentation on the mapping application. The second data can be presented as a tuple including longitude, latitude, or a combination thereof.

The implementations of the present disclosure can be applied on any type of aircraft that transmits transponder signals that include information on the aircraft's status. Examples of such aircrafts can include, but not limited to, airplane (e.g., passenger or cargo airplanes, business jets, etc.), helicopters, seaplanes, airships. The implementations can also be expanded to any other form of transportation vehicles capable of transmitting transponder signals and receiving the transponder signals inside the vehicle. For example, the implementations may be expanded to ocean liners, trains, trucks, etc.

Implementations of the subject matter and the functional operations described in this specification can be implemented in digital electronic circuitry, in tangibly-implemented computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non transitory program carrier for execution by, or to control the operation of, data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including, by way of example, a programmable processor, a computer, or multiple processors or computers. The apparatus can also be or further include special purpose logic circuitry, e.g., a central processing unit (CPU), a FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example Linux, UNIX, Windows, Mac OS, Android, iOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of submodules, third party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a central processing unit (CPU), a FPGA (field programmable gate array), or an ASIC (application specific integrated circuit.

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media (transitory or non-transitory, as appropriate) suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The memory may store various objects or data, including caches, classes, frameworks, applications, backup data, jobs, web pages, web page templates, database tables, repositories storing business and/ or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN), a wide area network (WAN), e.g., the Internet, and a wireless local area network (WLAN).

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be helpful. Moreover, the separation of various system modules and components in the implementations described above should not be understood as requiring such separation in all implementations, and it should be understood that the described program components and systems can generally be integrated together in a single software product or packaged into multiple software products.

While this document contains many specific implementation details, these should not be construed as limitations on the scope of what may be claimed, but rather as descriptions of features that may be specific to particular implementations or embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

What is claimed is:

1. A computer-implemented method executed by a computing system comprising one or more processors, the method comprising:
   receiving, by the computing system, a first aircraft transponder signal associated with an aircraft on which the computing system is located;
   identifying, by the computing system, first location data within the first aircraft transponder signal, wherein the first location data has a first format when the aircraft is in flight and a second format when the aircraft is on the ground, the second format being different from the first format;
   generating, by the computing system, second location data by converting the first location data to a data format recognizable by a geographic mapping application, the second location data being readable by the geographic mapping application to permit the geographic mapping application to present a graphical representation of a geographical location of the aircraft as represented by the first location data, wherein generating the second location data comprises determining that the aircraft is on the ground;
   in response to determining that the aircraft is on the ground, determining the geographical location of the aircraft as location of a particular airport from among one or more airports that are within a predetermined distance of at least one region among multiple possible geographical regions identified by the first location data; and
   providing, by the computing system, the second location data to the geographic mapping application for presentation to a user.

2. The method of claim 1, wherein when the first location data is in the first format a first process is used to generate the second location data, and when the first location data is in the second format a second process different form the first process is used to generate the second location data.

3. The method of claim 1, further comprising extracting the first aircraft transponder signal from a plurality of aircraft transponder signals based on an identifier, the identifier indicating that the first aircraft transponder signal is associated with the aircraft.

4. The method of claim 3, wherein extracting the first aircraft transponder signal comprises filtering out information of one or more aircrafts from the aircraft transponder signals, each of the one or more aircrafts differing from the aircraft on which the computing system is located.

5. The method of claim 3, wherein the identifier is included in a header of the first aircraft transponder signal.

6. The method of claim 3, wherein the identifier is provided by a system user.

7. The method of claim 1, wherein the geographic mapping application displays a geographical presentation of the second location data.

8. The method of claim 1, wherein providing the second location data to the geographic mapping application comprises broadcasting the second location data to one or more computing systems through a local communication network within the aircraft.

9. The method of claim 1, wherein the first aircraft transponder signal has been transmitted by the aircraft on which the computing system is located.

10. The method of claim 1, wherein the first aircraft transponder signal comprises an ADS-B Out signal.

11. The method of claim 1, wherein the geographical location is determined based on comparing the multiple possible geographical regions identified by the first location data, and a list of airports that includes the one or more airports.

12. The method of claim 1, further comprising identifying the particular airport from among the one or more airports as an airport that has the shortest distance from the at least one region.

13. The method of claim 1, wherein geographical coordinates of the multiple possible geographical regions differ from each other by a factor of a particular angle along at least one of a longitude direction and a latitude direction.

14. An electronic flight bag (EFB) comprising:
a radio receiver tuned to receive aircraft transponder signals;
one or more processors in electrical communication with the radio receiver; and
one or more computer-readable storage devices coupled to the one or more processors and having instructions stored thereon which, when executed by the one or more processors, cause the one or more processors to perform operations comprising:
receiving a first aircraft transponder signal associated with an aircraft on which the EFB is located;
identifying first location data within the first aircraft transponder signal, wherein the first location data has a first format when the aircraft is in flight and a second format when the aircraft is on the ground, the second format being shorter than the first format;
generating second location data by converting the first location data to a data format recognizable by a geographic mapping application, the second location data being readable by the geographic mapping application to permit the geographic mapping application to present a graphical representation of a geographical location of the aircraft as represented by the first location data; and
providing the second location data to the geographic mapping application for presentation to a user.

15. The EFB of claim 14, wherein when the first location data is in the first format a first process is used to generate the second location data, and when the first location data is in the second format a second process different form the first process is used to generate the second location data.

16. The EFB of claim 14, wherein the operations further comprise extracting the first aircraft transponder signal from a plurality of aircraft transponder signals by filtering out information of one or more aircrafts from the plurality of aircraft transponder signals, each of the one or more aircrafts differing from the aircraft on which the EFB is located.

17. An electronic flight bag (EFB) upgrade kit comprising:
a radio receiver tuned to receive aircraft transponder signals, wherein the radio receiver is configured to be installed in an EFB; and
one or more non-transitory computer-readable storage media storing instructions which, when executed by one or more processors of the EFB, cause the one or more processors to perform operations comprising:
receiving a first aircraft transponder signal associated with an aircraft on which the one or more processors are located;
identifying first location data within the first aircraft transponder signal, wherein the first location data has a first format when the aircraft is in flight and a second format when the aircraft is on the ground, the second format being shorter than the first format;
generating second location data by converting the first location data to a data format recognizable by a geographic mapping application, the second location data being readable by the geographic mapping application to permit the geographic mapping application to present a graphical representation of a geographical location of the aircraft as represented by the first location data; and
providing the second location data to the geographic mapping application for presentation to a user.

18. The EFB upgrade kit of claim 17,
wherein when the first location data is in the first format a first process is used to generate the second location data, and when the first location data is in the second format a second process different form the first process is used to generate the second location data.

19. An electronic flight bag (EFB) upgrade kit comprising:
a radio receiver tuned to receive aircraft transponder signals, wherein the radio receiver comprises a USB dongle configured to be installed in an EFB; and
one or more non-transitory computer-readable storage media storing instructions which, when executed by one or more processors of the EFB, cause the one or more processors to perform operations comprising:
receiving a first aircraft transponder signal associated with an aircraft on which the one or more processors are located;
identifying first location data within the first aircraft transponder signal;
generating second location data by converting the first location data to a data format recognizable by a geographic mapping application, the second location data being readable by the geographic mapping application to permit the geographic mapping application to present a graphical representation of a geographical location of the aircraft as represented by the first location data; and
providing the second location data to the geographic mapping application for presentation to a user.

20. The EFB upgrade kit of claim 19, wherein the radio receiver comprises a software defined radio installed on the USB dongle.

\* \* \* \* \*